United States Patent
Dawson, III et al.

[19]

[11] Patent Number: 6,145,021
[45] Date of Patent: Nov. 7, 2000

[54] METHOD AND SYSTEM FOR MANAGING RESOURCE ALLOCATION FOR PLUG AND PLAY DEVICES BY PROVIDING ONLY THE RESOURCES REQUIRED TO THE DEVICES BEFORE SYSTEM INITIALIZATION

[75] Inventors: Marshall Allen Dawson, III, Longmont, Colo.; John Matthew Landry, Wake Forest, N.C.

[73] Assignee: International Business Machines Corporation, Armonk, N.Y.

[21] Appl. No.: 09/089,597

[22] Filed: Jun. 2, 1998

[51] Int. Cl.[7] ............................................. G06F 13/14
[52] U.S. Cl. ............................ 710/8; 710/10; 710/17; 710/19; 710/104
[58] Field of Search ............................ 710/8, 10, 17, 710/19, 104

[56] References Cited

U.S. PATENT DOCUMENTS

| | | | |
|---|---|---|---|
| 5,524,248 | 6/1996 | Parks et al. | 395/750 |
| 5,778,245 | 7/1998 | Papworth et al. | 395/800.23 |
| 5,881,252 | 3/1999 | Sahgal et al. | 710/104 |
| 5,918,049 | 6/1999 | Syvaniemi | 395/674 |
| 5,946,297 | 8/1999 | Calvignac et al. | 370/230 |
| 6,009,480 | 12/1999 | Pleso | 710/8 |
| 6,014,714 | 1/2000 | Plyler et al. | 710/8 |

OTHER PUBLICATIONS

IBM Corporation—Automatic Segment Resizing to Conserve Use of Subsetted Memory—Jun. 1992—Journal—p. 449.

IBM Corporation—Processor to Communications Controller Interface Technique—Apr. 1971—Journal—pp. 3465–3467.

*Primary Examiner*—Thomas C. Lee
*Assistant Examiner*—Thuan Du
*Attorney, Agent, or Firm*—Andrew Dillon; Anthony N. Magistrale

[57] ABSTRACT

A method and system for managing resources required by peripheral devices present within a computer system, the resources selected from a group of resources required for audio, video, pointing device, input, output, memory, and modem devices. A nominal selection of resources is initially associated with a peripheral device present within the computer system. Next, a minimal amount of resources required by the peripheral device to function normally within the computer system is determined, in response to associating the nominal selection of resources with the peripheral device. Finally, the computer system is automatically reconfigured, in response to user input, such that the peripheral device functions normally within the computer system utilizing a minimal amount of resources without inadvertently utilizing resources not required by the peripheral device during a particular operation of the peripheral device, thereby providing relief to a resource constrained computer system, wherein a multitude of peripheral devices function. Thereafter, a particular operation of the peripheral device is initiated, and the peripheral device operates in association with utilization of minimal resources required by the peripheral device to function normally within said computer system.

9 Claims, 4 Drawing Sheets

METHOD AND SYSTEM FOR MANAGING RESOURCE ALLOCATION FOR PLUG AND PLAY DEVICES BY PROVIDING ONLY THE RESOURCES REQUIRED TO THE DEVICES BEFORE SYSTEM INITIALIZATION

BACKGROUND OF THE INVENTION

1. Technical Field

The present invention relates in general to the field of information processing systems. In particular, the present invention relates to computer systems which incorporate peripheral devices, such as audio, video, pointing device, input, output, memory, and modem peripheral devices. More particularly, the present invention relates to computer systems having resources for such peripheral devices that must be allocated within the computer system in order to enhance system performance. Still more particularly, the present invention relates to a method and system that provides relief to resource-constrained computer systems.

2. Description of the Related Art

Computer systems, such as personal computers, are increasingly being designed and constructed fill-featured, with many types of peripheral devices integrated with such computers systems. Peripheral devices, such as mouse, modem, audio, video, memory and input/output ports are now standard within such computer systems. As a result of having so many peripheral devices integrated within computer systems, system resources, such as direct memory access (DMA) channels, memory, input/output ports, and hardware interrupt request (IRQ) signals, are becoming increasingly constrained, which diminishes or eliminates altogether the possibility of expanding the computer system.

One technique which attempts to manage system resources includes the so-called "Plug and Play" protocols which are composed of a set of specifications that allows a computer system to configure itself automatically to work with peripherals such as monitors, modems, printers, and so forth. A user can "plug" in a peripheral and "play" it without manually configuring the system. Plug and Play requires both a BIOS that supports Plug and Play, and a Plug and Play device, which can either be located on a system board or in an expansion slot. (BIOS is an acronym for "Basic Input/Output System." On personal computer compatible computers, BIOS is composed of the set of essential software routines that test hardware at start-up, start the operating system, and support the transfer of data among hardware devices. The BIOS is stored in read-only memory (ROM), so that it can be executed when power is applied to the computer. Although critical to performance, the BIOS is usually "invisible" to computer users.)

The ISA (Industry Standard Architecture) Plug and Play specification allows devices to outline dependencies in resources, as well as sub-optimal configurations. Unfortunately, BIOS implementations as well as Plug and Play operating systems, such as Windows 95™ (a product of Microsoft Corporation), currently attempt to fully configure all devices, without regard to the needs of the other devices present in a given computer system. In other words, it would seem that a user could simply utilize the "set-up" option present within the computer system to control whether particular devices are assigned particular resources. However, even if the ISA Plug and Play BIOS attempts to partially configure the device, the Plug and Play operating system will override the configuration, potentially disallowing the configuration of other devices. The only way to completely prevent this behavior is to control the resources that the device requests. Current Plug and Play routines are unable to prevent such behavior in an efficient and user-friendly manner. Based on the foregoing, it can be appreciated that what is needed to overcome such drawbacks is a method and system that would allow a user to efficiently manage the allocation of system resources for particular devices, without having to provide all resources for a particular device during an allocation. Such a method and system, if implemented, would overcome the limitation of current Plug and Play routines.

SUMMARY OF THE INVENTION

It is an object of the present invention to provide an improved information processing system.

It is another object of the present invention to provide an improved computer system which incorporates peripheral devices, such as audio, video, pointing device, input, output, memory, and modem peripheral devices.

It is yet another object of the present invention to provide an improved computer system, wherein resources for peripheral devices present within the computer system are allocated in an efficient manner in order to enhance system performance.

It is still another object of the present invention to provide an improved method and system which provides relief to resource-constrained computer systems.

The above and other objects are achieved as is now described. A method and system are disclosed for managing resources required by peripheral devices present within a computer system, the resources selected from a group of resources required for audio, video, pointing device, input, output, memory, and modem devices. A nominal selection of resources is initially associated with a peripheral device present within the computer system. Next, a minimal amount of resources required by the peripheral device to function normally within the computer system is determined, in response to associating the nominal selection of resources with the peripheral device. Finally, the computer system is automatically reconfigured, in response to user input, such that the peripheral device functions normally within the computer system utilizing the minimal amount of resources without inadvertently utilizing resources not required by the peripheral device during a particular operation of the peripheral device, thereby providing relief to a resource constrained computer system, wherein a multitude of peripheral devices function. Thereafter, a particular operation of the peripheral device is initiated, and the peripheral device operates in association with utilization of minimal resources required by the peripheral device to function normally within said computer system.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
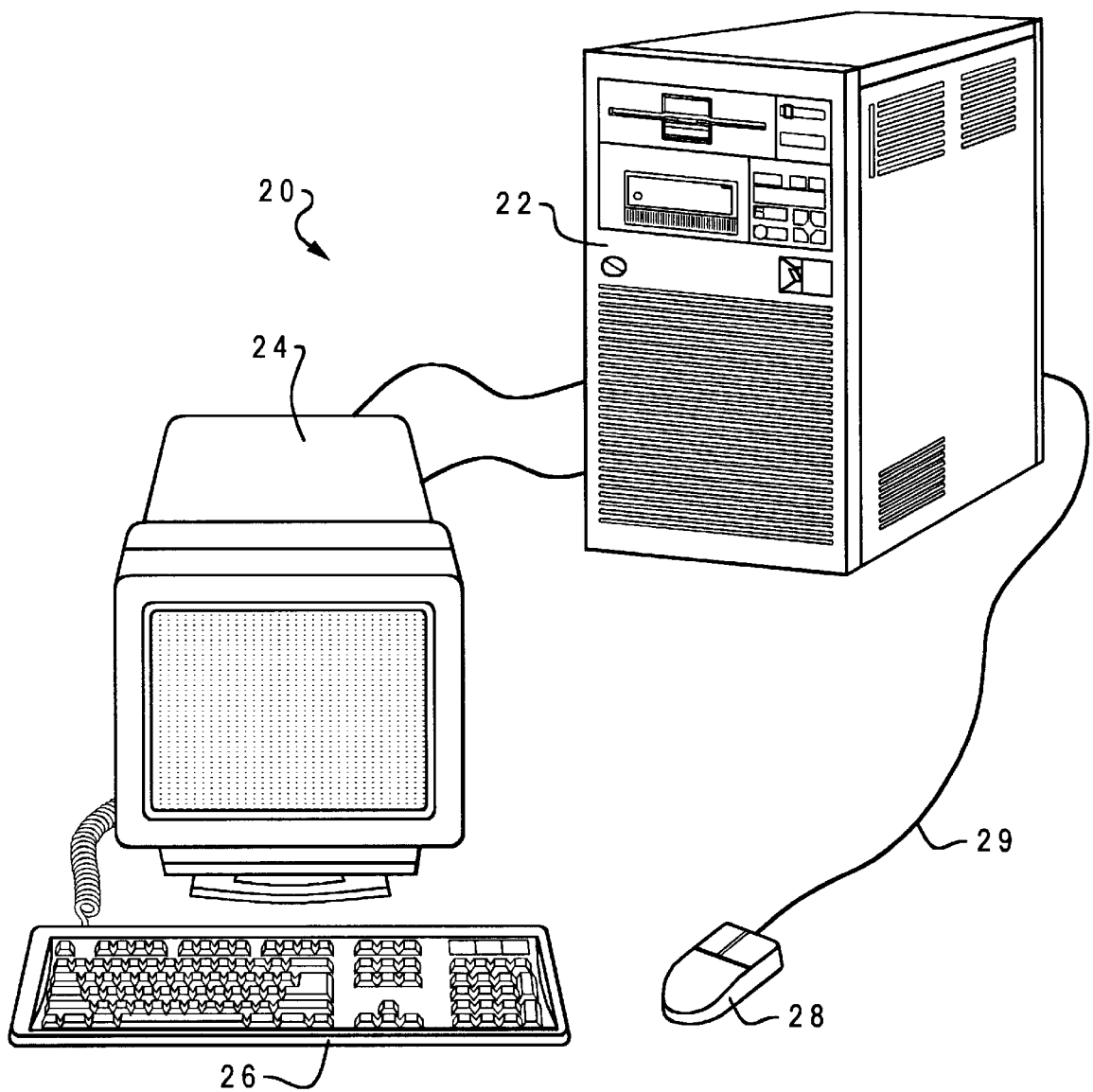
FIG. 1 illustrates a pictorial representation of a computer system which may be utilized to implement a preferred embodiment of the present invention.

With reference now to the figures and in particular with reference to FIG. 1, there is depicted a pictorial representation of a computer system which may be utilized to implement a preferred embodiment of the present invention. A computer system 20 is depicted that includes a system unit 22, a video display terminal 24, a keyboard 26, and a mouse 28. A cable 29 connects mouse 28 to system unit 22. Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24.

Mouse 28 is a commonly utilized graphical pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g., a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Thus, according to a preferred embodiment of the present invention, the user can utilize the mouse to place the graphical representation of a cursor (i.e. mouse pointer) over a desired hypertext link displayed within a computer screen of a video display terminal such as video display terminal 24, and then, utilizing the pointing device, "click" the mouse at the hypertext link to an Internet web page.

Figure 2:
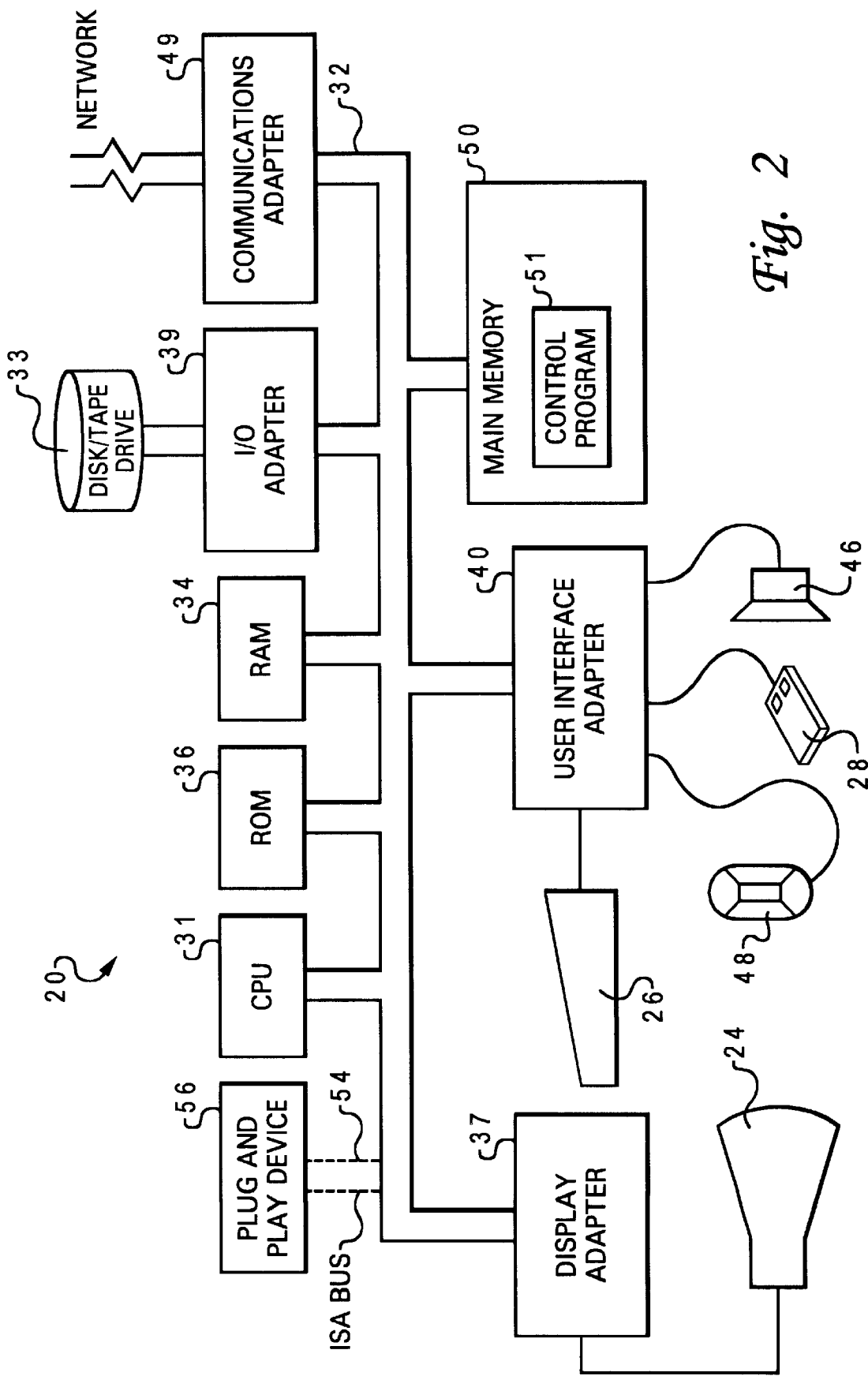
FIG. 2 depicts a representative hardware environment of the computer system illustrated in FIG. 1.

Computer system 20 can be implemented utilizing any suitable computer such as the IBM Aptiva™ computer system, a product of International Business Machines Corporation (IBM), located in Armonk, N.Y. However, those skilled in the art will appreciate that a preferred embodiment of the present invention can apply to any computer system, regardless of whether the computer system is a complicated multi-user computing apparatus or a single-user workstation or a network computer. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAW 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 is the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Speaker 46 is one type of audio device that may be utilized in association with the method and system provided herein to assist diagnosticians or computer users in analyzing computer system 20 for system failures, errors, and discrepancies. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIX windows windowing system can direct CPU 31. The AIX operating system is IBM's implementation of the UNIX™ operating system. "UNIX" is a trademark of UNIX Systems Laboratories, Inc. Other technologies also can be utilized in conjunction with CPU 31, such as touch-screen technology or human voice control.

Operating systems typically include computer software for controlling the allocation and usage of hardware resources such as memory, CPU time, disk space, and peripheral devices. The operating system is the foundation upon which applications, such as word-processing, spreadsheet, and web browser programs are built. Although not specifically depicted in computer system 20, expansion slots may also be included for adding adapters and devices such as video controllers as described herein. In addition, Computer system 20 includes an ISA bus 54 linked to a generic Plug and Play device 56.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carry out the operations depicted in the logic flowchart of FIG. 3 described herein. The computer program product also can be referred to as a program product. Control program 51 contains instructions that when executed on CPU 31 can carry out logical operations such as those operations depicted in the logic flow charts of FIG. 3 described herein.

Although not specifically depicted in FIG. 1 and FIG. 2, computer system 20 contains an on-board audio device (e.g., Crystal 4236B) that is "Plug and Play" compliant. In particular, computer system 20 may conform to "Plug and Play ISA Specification v. 1.0a," a methodology that allows ISA devices to communicate resource needs to the computer system via hardware configuration registers. The present invention described herein thus takes advantage of ISA Plug and Play architecture to alleviate some resource constraints. The resource data that a particular peripheral device sends to the Plug and Play configuration software can be initialized via an on-board Electrically Erasable Programmable Read Only Memory ($E^2$PROM), or downloaded (i.e., programmed) by the system Power-On Self Test (POST). (POST is a set of routines stored in a computer's read-only memory (ROM) that tests various system components, such as RAM, the disk drives, and the keyboard to determine if such components are properly connected and operating normally. If problems are discovered related to such components, the POST routines alert the user by sounding a series of "beeps," or simply displaying a message, often accompanied by a diagnostic numeric value, to the standard output or standard error device (i.e., usually the screen). If the power-on self test is successful, it passes control back to the computer system. In the example described herein, the resource data or resources are downloaded to the computer system during POST.)

In the case of an audio peripheral device, the audio device's standard resource data calls out the requirements for sound card compatibility, control ports, a joystick and Musical Instrument Digital Interface (MIDI) support. MIDI is a serial interface standard that allows for the connection of music synthesizers, musical instruments, and computers. The MIDI standard is based partly on hardware and partly on a description of the way in which music and sound are encoded and communicated between MIDI devices. For full MIDI usage, input/output ports are required, along with an IRQ. However, the IRQ is used only when a MIDI instrument is actually plugged into the system. MIDI playback from the PC does not require an IRQ. Therefore, on the vast majority of systems, this IRQ is simply wasted.

Thus, in a preferred embodiment of the present invention, the resources that the Plug and Play device requests are controlled. Based on a user's selection in the "setup utility" (e.g., see FIG. 4 and FIG. 5 herein), POST can program different sets of resources or resource data into the Plug and Play logic of the audio device. For example, if an IRQ is not needed for MIDI (i.e., no MIDI instrument is connected to the system), a special set of resources or resource data is downloaded into the audio device. Standard resources are downloaded if the MIDI device does require the IRQ. This data will be read later by the Plug and Play configuration software, either by POST or the computer operating system itself. Note that in most personal computer systems (i.e., those without MIDI instruments), an additional IRQ signal is made available for possible expansion, because minimal resource data were applied to the MIDI device.

Those skilled in the art thus can appreciate that a preferred embodiment of the present invention solves a problem that initially appears to be simple, but in reality, can be complicated and time-consuming to address. Plug and Play ISA Specification v. 1.0a, which may be utilized in accordance with a preferred embodiment of the present invention, allows peripheral devices to outline dependencies in resources, as well as sub-optimal configurations. Unfortunately, BIOS implementations, as well as "Plug and Play" operating systems, such as Windows 95™ currently attempt to fully configure all peripheral devices, without regard to the needs and requirements of other peripheral devices. In other words, it would seem that one could simply utilize the "setup" option (i.e., setup utility) to control whether the MIDI device is assigned an IRQ. However, this is not the case, because even if the system POST partially configures the computer system, the Plug and Play operating system will override the configuration, potentially disallowing the configuration of other devices. The only way to completely prevent such behavior is to control resource data requested by a particular peripheral device.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3:
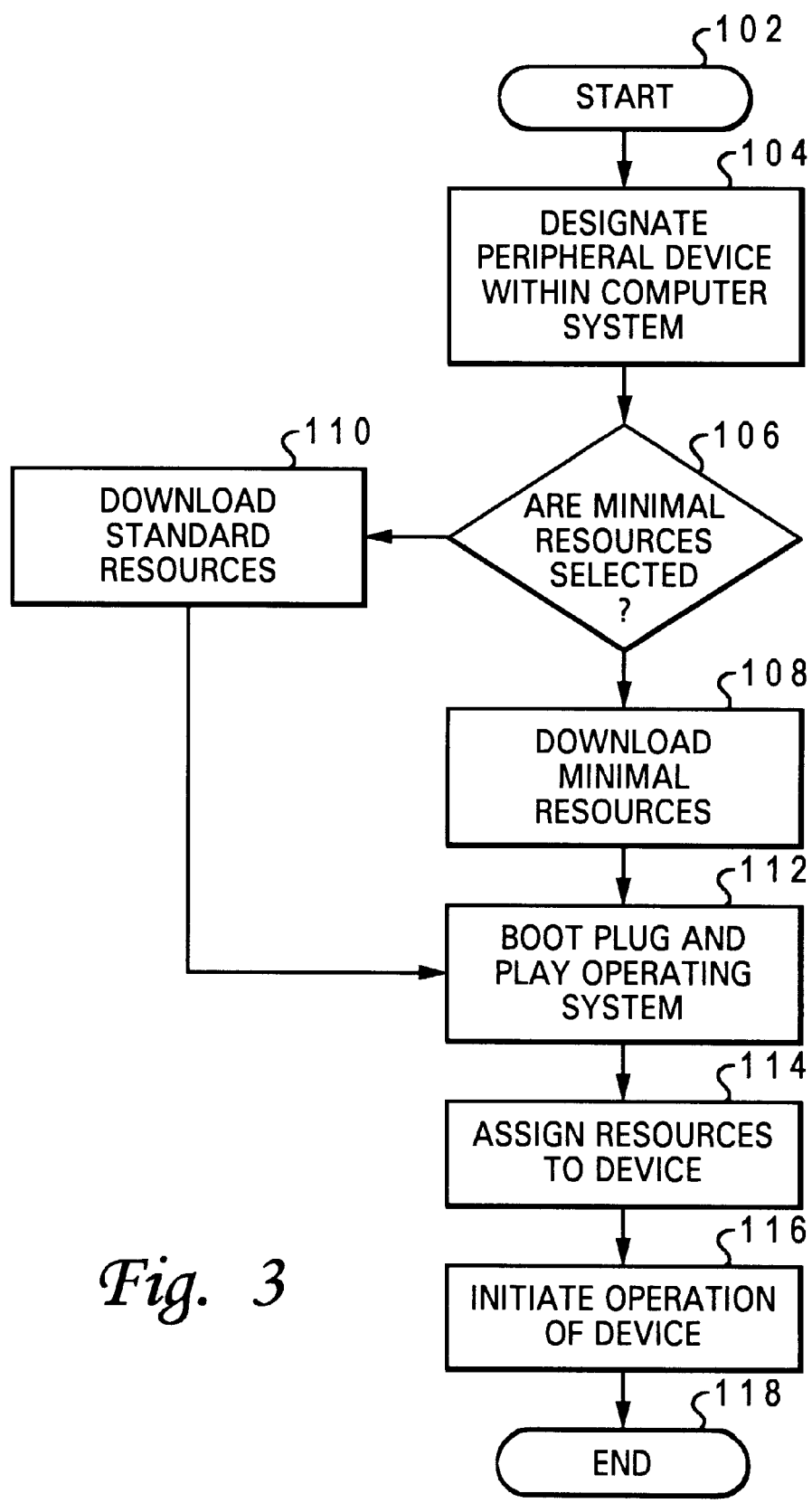
FIG. 3 illustrates a high level logic flow diagram that depicts steps in the process utilized to carry out system initialization with Plug and Play resource data, according to a preferred embodiment of the present invention.

FIG. 3 illustrates a high level logic flow diagram 100 that depicts steps in the process utilized to carry out system initialization with Plug and Play resource data, according to a preferred embodiment of the present invention. Logic flow diagram 100 depicts a method in a computer system for managing resources required by peripheral devices. Such resources are selected from a group of resources required for devices, such as audio, video, pointing device, input, output, memory, and modem devices. It can be appreciated by those skilled in the art that FIG. 3 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "determining," "configuring," "reconfiguring," and so forth, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps of operating a computer, such as computer system 20 depicted in FIG. 1 and FIG. 2, in processing electrical or other (e.g. mechanical, chemical) physical signals to generate other desired physical signals.

Thus, as depicted at block 102, the process is initiated. As depicted thereafter at block 104 a peripheral device is designated within the computer system (i.e., computer system 20 of FIG. 1 and FIG. 2). A nominal selection of resources (e.g., resource data) are associated with the peripheral device. A minimal amount of resources required by the peripheral device to function normally within the computer system is determined, in response to associating the nominal selection of resources associated with the peripheral device. Thus, the peripheral device starts with a nominal set of resources and then obtains the minimum resources necessary for a different operation mode. However, those skilled in the art will appreciate that such a technique may vary. For example, the peripheral device may by default use minimum resources, unless a user is in need of an enhanced device function requiring additional resources. Either way, as illustrated thereafter at block 106, a test is performed to determine if minimal resources have been selected.

If minimal resources are not selected, then as illustrated at block 110, standard resources are downloaded and the process continues, as indicated thereafter at block 112. However, if minimal resources are selected, then as described at block 108, minimal resources are downloaded. As depicted thereafter at block 112, the Plug and Play operating system is "booted." Next, as illustrated at block 114, the resources are assigned to the peripheral device, according to the resource requirements specified in the resource data that were downloaded, as described at block 108 and 110. In essence, the logical operations performed, as depicted in blocks 108, 112 and 114, result in an automatic reconfiguration of the computer system, in response to user input, such that the peripheral device functions normally within the computer system without inadvertently utilizing resources not required by the peripheral device during a particular operation of the peripheral device, thereby providing relief to a resource constrained computer system, wherein a multitude of peripheral devices function. Thereafter, as indicated at block 116, a particular operation of the peripheral device is initiated. The process terminates thereafter, as described at block 118. The operations depicted in blocks 102, 104, 106, 108 and 110 occur under BIOS/POST control, while the operations illustrated at blocks 112, 114, 116, and 118 function under the control of the Plug and Play operating system.

Those skilled in the art will appreciate that for each possible operation mode of an ISA Plug and Play device with downloadable resource data, utilized in accordance with a preferred embodiment of the present invention, the BIOS stores a predefined set of resource data for each mode. In the example depicted herein, only two potential configurations are provided (i.e., with or without external MIDI). However, each such device could have "n" sets of resource data available for "n" modes of operation that the device can support. In addition, those skilled in the art will appreciate that the user selects the operation mode via a system "setup utility," before the Plug and Play operating system is booted.

Figure 4:
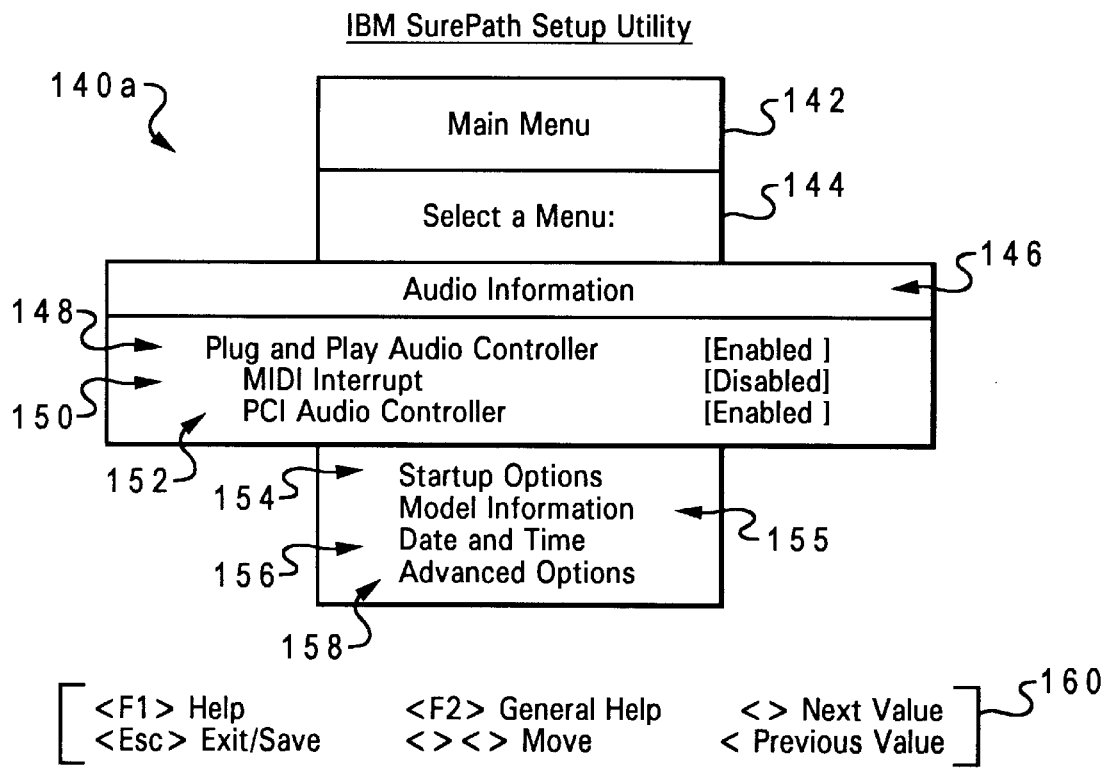
FIG. 4 illustrates a setup utility menu, in accordance with a preferred embodiment of the present invention.
Figure 5:
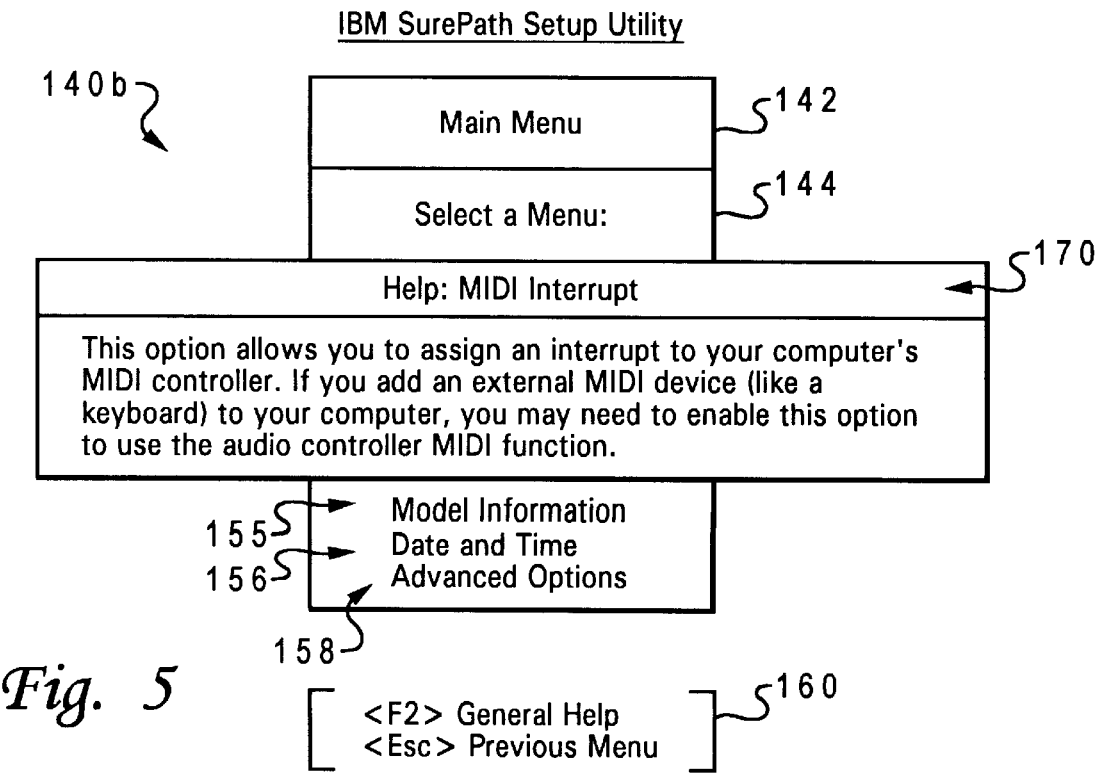
FIG. 5 depicts a modified version of the setup utility menu of FIG. 4, in accordance with a preferred embodiment of the present invention.

FIG. 4 illustrates a setup utility menu 140a, in accordance with a preferred embodiment of the present invention. FIG. 5 depicts a setup utility menu 140b, which is a modified version of setup utility menu 140a of FIG. 4, in accordance with a preferred embodiment of the present invention. In FIG. 4 and FIG. 5, like parts are indicated by like reference numerals. In FIG. 4, a main menu 142 is presented in which a user is prompted to select a menu, as indicated at 144. In the example, depicted in FIG. 4, the user has chosen audio information 146. Under the "audio information" category, various options are given. For example, the user may enable or disable Plug and Play Audio Controller 148, MIDI Interrupt 150, and PCI Audio Controller 152. Additional menu choices include Startup Options 154, Model Information 155, Date and Time 156, and Advanced Options 158. A key menu 160 also depicts functional keys and other keyboard input buttons which may be utilized to implement the items listed in main menu 142. Setup utility menu 140b includes, as an option, a MIDI Interrupt Help 170 option, which as indicated in FIG. 5, allows the user to assign an interrupt to the computer's MIDI controller. If the user adds an external MIDI device, such as a MIDI keyboard or other MIDI musical instrument, the user may need to enable the optional device in order to use the audio controller MIDI function.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. For example, the method and system presented herein functions with all types of configuration routines, such as BIOS, OS, and so forth, and is not limited to operating in association with only one particular type of configuration routine. The description as set forth is not intended to be exhaustive or to limit the invention to the precise form disclosed. Many modifications and variations are possible in light of the above teaching without departing from the spirit and scope of the following claims.

What is claimed is:

1. A method in a computer system for managing data processing resources required by a peripheral device within said computer system, wherein said peripheral device includes plug and play configuration logic for requesting data processing resources in accordance with peripheral device functionality, and wherein said computer system includes a plug and play operating system that allocates data processing resources to said peripheral device according to said plug and play configuration logic, said method comprising the steps of:

selecting at least one functionality option required for audio, video, pointing device, input, output, memory, and modem devices for said peripheral device;

determining resources required by said selected at least one functionality option;

downloading said selected at least one functionality option to said plug and play configuration logic prior to initialization of said peripheral device within said plug and play operating system, such that said plug and play operating system allocates data processing resources to said peripheral device in conformity with said selected functionality option; and automatically reconfiguring said computer system, in response to said downloading step, such that said peripheral device functions normally within said computer system utilizing said minimal amount of resources without inadvertently utilizing resources not required by said peripheral device during a particular operation of said peripheral device, thereby providing relief to a resource constrained computer system, wherein a multitude of peripheral devices function.

2. The method of claim 1 further comprising the steps of:

initiating a particular operation of said peripheral device; and operating said peripheral device in association with utilization of minimal data processing resources required by said peripheral device to function normally within said computer system.

3. The method of claim 1, wherein said computer system further includes a setup program for configuring said peripheral device within said computer system, wherein said setup program provides a user interface for selecting among said multiple functionality options, and wherein said selecting step further comprises the step of providing user input into said user interface, such that said operating system allocates said data processing resources in accordance with user-determined functionality requirements.

4. A system for managing data processing resources required by a peripheral device, wherein said peripheral device includes plug and play configuration logic for requesting data processing resources in accordance with peripheral device functionality, and wherein said computer system includes a plug and play operating system that allocates data processing resources to said peripheral device according to said plug and play configuration logic, said system comprising:

processing means for selecting at least one functionality option required for audio, video, pointing device, input, output, memory and modem devices for said peripheral device;

means for determining resources required by said selected at least one functionality option;

processing means for downloading said selected at least one functionality option to said plug and play configuration logic prior initialization of said peripheral device within said plug and play operating system, such that said plug and play operating system allocates date processing resources to said peripheral device in conformity with said selected functionality option; and means for automatically reconfiguring said computer system, in response to downloading said selected at least one functionality option, such that said peripheral device functions normally within said computer system utilizing said minimal amount of resources without inadvertently utilizing resources not required by said peripheral device during a particular operation of said peripheral device, thereby providing relief to a resource constrained computer system, wherein a multitude of peripheral devices function.

5. The system of claim 4 further comprising:

data input means for initiating a particular operation of said peripheral device; and processing means for operating said peripheral device in association with utilization of minimal data processing resources required by said peripheral device to function normally within said computer system.

6. The system of claim 4, wherein said computer system further includes a setup program for configuring said peripheral device within said computer system, wherein said setup program provides and wherein said processing means for selecting at least one functionality option further comprises a user interface for selecting among said multiple functionality options, such that said operating system allocates said data processing resources in accordance with user-determined functionality requirements.

7. A program product residing in computer memory for managing data processing resources required by a peripheral device, wherein said peripheral device includes plug and play configuration logic for requesting data processing resources in accordance with peripheral device functionality, and wherein said computer system includes a plug and play operating system that allocates data processing resources to said peripheral device according to said plug and play configuration logic, said program product comprising:

instruction means residing in a computer for selecting at least one functional option required for audio, video, pointing device, input, output, memory, and modem devices for said peripheral device;

instruction means residing in a computer for determining resources required by said selected at least one functionality option;

instruction means residing in a computer for downloading said selected at least one functionality option to said plug and play configuration logic prior to initialization of said peripheral device within said plug and play operating system, such that said plug and play operating system allocates data processing resources to said peripheral device in conformity with said selected functionality option; and instruction means residing in a computer for automatically reconfiguring said computer system, in response to downloading said selected at least one functionality option, such that said peripheral device functions normally within said computer system utilizing said minimal amount of resources without inadvertently utilizing resources not required by said peripheral device during a particular operation of said peripheral device, thereby providing relief to a resource constrained computer system, wherein a multitude of peripheral devices function.

8. The program product of claim 7 further comprising.

instruction means residing in a computer for initiating a particular operation of said peripheral device; and instruction means residing in a computer for operating said peripheral device in association with utilization of minimal data processing resources required by said peripheral device to function normally within said computer system.

9. The program product of claim 7, wherein said computer system further includes a setup program for configuring said peripheral device within said computer system, wherein said setup program provides a user interface for selecting among said multiple functionality options, and wherein said instruction means for selecting at least one functionality option further comprises instruction means for providing user input into said user interface, such that said operating system allocates said data processing resources in accordance with user-determined functionality requirements.

* * * * *